(12) United States Patent
Kasai et al.

(10) Patent No.: US 10,180,344 B2
(45) Date of Patent: Jan. 15, 2019

(54) ELECTRIC DISCHARGE MACHINE

(71) Applicant: FANUC Corporation, Yamanashi (JP)

(72) Inventors: Hirotsugu Kasai, Yamanashi (JP); Hisanori Kouda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 267 days.

(21) Appl. No.: 15/220,863

(22) Filed: Jul. 27, 2016

(65) Prior Publication Data
US 2017/0030762 A1 Feb. 2, 2017

(30) Foreign Application Priority Data

Jul. 28, 2015 (JP) ................. 2015-148932

(51) Int. Cl.
*G01F 23/00* (2006.01)
*B23H 1/00* (2006.01)
(Continued)

(52) U.S. Cl.
CPC ............... *G01F 23/30* (2013.01); *B23H 1/00* (2013.01); *B23H 1/02* (2013.01); *B23H 7/14* (2013.01);
(Continued)

(58) Field of Classification Search
CPC ....................................... G01F 23/30
(Continued)

(56) References Cited

U.S. PATENT DOCUMENTS 4,622,449 A * 11/1986 Inoue ................. B23Q 3/15513
204/224 M
2007/0228015 A1 10/2007 Kita et al.
(Continued)

FOREIGN PATENT DOCUMENTS

CN 101049646 A 10/2007
CN 101398323 A 4/2009
(Continued)

OTHER PUBLICATIONS

Office Action in JP Application No. 2015-148932, dated Aug. 22, 2017, 4 pp.
Extended European Search Report in EP Application No. 16181135.1, dated Dec. 9, 2016.

*Primary Examiner* — Walter L Lindsay, Jr.
*Assistant Examiner* — Philip Marcus T Fadul
(74) *Attorney, Agent, or Firm* — Hauptman Ham, LLP

(57) ABSTRACT

A machining liquid is supplied to a predetermined level when a workpiece is on a table. A volume of the workpiece is obtained from a difference between the machining liquid amount at the predetermined level when a previous workpiece is not on the table, and the machining liquid amount when the workpiece is on the table. A weight of the workpiece is obtained from the obtained volume and a previously stored density of the workpiece. A weight of a mounting jig is obtained in the same procedure. A total volume of the jig and workpiece is obtained when the jig is on the table and the workpiece is fixed to the jig. The volume of the workpiece is obtained by a difference with respect to the volume of the jig. The weight of the workpiece fixed to the jig is obtained from the obtained volume and the previously stored density.

11 Claims, 4 Drawing Sheets

(51) Int. Cl.
*G01F 23/30* (2006.01)
*B23H 7/20* (2006.01)
*G05B 19/404* (2006.01)
*B23H 1/02* (2006.01)
*B23H 7/14* (2006.01)
*B23H 11/00* (2006.01)
*G01G 9/00* (2006.01)
*B23H 1/10* (2006.01)

(52) U.S. Cl.
CPC ............... *B23H 7/20* (2013.01); *B23H 11/00* (2013.01); *G01F 23/00* (2013.01); *G01G 9/00* (2013.01); *G05B 19/404* (2013.01); *B23H 1/10* (2013.01); *B23H 2500/00* (2013.01); *G05B 2219/45221* (2013.01)

(58) Field of Classification Search
USPC .......................................................... 73/291
See application file for complete search history.

(56) References Cited

U.S. PATENT DOCUMENTS

| | | |
|---|---|---|
| 2013/0043216 A1 | 2/2013 | Kouda |
| 2014/0207272 A1 | 7/2014 | Kouda |

FOREIGN PATENT DOCUMENTS

| | | | |
|---|---|---|---|
| CN | 202471166 U | | 10/2012 |
| EP | 2559512 A1 | | 2/2013 |
| JP | 58-192720 A | | 11/1983 |
| JP | 62-271633 A | | 11/1987 |
| JP | 6-147952 A | | 5/1994 |
| JP | 2002-178299 A | | 6/2002 |
| JP | 2003-275925 A | | 9/2003 |
| JP | 2008-49459 A | | 3/2008 |
| JP | 2012192512 A | * | 10/2012 |
| JP | 2013-156190 A | | 8/2013 |

* cited by examiner

ELECTRIC DISCHARGE MACHINE

RELATED APPLICATIONS

The present application claims priority to Japanese Patent Application Number 2015-148932, filed Jul. 28, 2015, the disclosure of which is hereby incorporated by reference herein in its entirety.

BACKGROUND OF THE INVENTION

1. Field of the Invention

The present invention relates to an electric discharge machine having a function to automatically calculate a weight of a workpiece.

2. Description of the Related Art

In electric discharge machining, an electrode gap formed between a workpiece and an electrode is exposed to high temperature and a moisture amount in machining liquid is reduced, or a moisture amount in machining liquid is reduced by natural evaporation in some cases. If the moisture amount is reduced in machining liquid in which water and oil are mixed, this could be a cause to largely reduce machining speed of the electric discharge machining or to hinder stable electric discharge machining.

To solve this problem, JP 2012-192512 A discloses an electric discharge machine including a measuring device for measuring a weight of machining liquid using a measuring tank, a water supply device for supplying water to the machining liquid, computing means for computing a reduction amount of water in the machining liquid based on the weight of the machining liquid measured by the measuring device, and a controller having control signal generating means for generating a control signal which operates the water supply device based on the reduction amount computed by the computing means.

When a weight of a workpiece is measured in a wire electric discharge machine, it is general to measure the weight using a scale, but when a workpiece having a large weight is to be measured, it is necessary to prepare a large measuring device, and there is a problem that the measuring operation requires labor.

When a workpiece to be electric discharge machined is placed on a table in a machining tank, there is a problem that a machine body of a casting or a guide is distorted under the influence of the weight of the workpiece, and a pitch error is influenced. There is a countermeasure method to again correct a pitch error correction value using a correction value corresponding to weights of the respective workpieces, but it is necessary to input previously measured weights of the workpieces to the controller.

When workpieces having the same weight are continuously machined, a weight of a workpiece which is machined first is measured, and this measured weight can be used and thus, there is no problem. However, when workpieces having different weights are continuously machined, since it is necessary to measure the weight in each case, the weight-measuring operation of the workpiece requires labor. When measured weight data is erroneously input to the controller, the correction amount cannot precisely be calculated.

When a workpiece which is to be electric discharge machined is fixed to a table using a jig, in order to precisely correct a pitch error, it is necessary to take a weight of the jig into account. Like the workpiece, there is a problem that a machine body of a casting or a guide is distorted under the influence of the weight of the jig, and a pitch error is influenced.

There is a countermeasure method to again correct a pitch error correction value using a correction value corresponding to weights of the respective workpieces, but it is necessary to input the previously measured weight of the jig into the controller. When jigs having the same weight are continuously used, a weight of a jig which is first used is measured, and the value can be used and thus, there is no problem. However, when jigs having different weights are used, since it is necessary to measure the weight in each case, the weight-measuring operation of the jigs requires labor. When measured weight data of the jigs is erroneously input to the controller of the electric discharge machine, the correction amount cannot precisely be calculated. When materials of workpieces and jigs are different from each other, an operation for detaching the workpieces and the jigs from the machine to measure the weights individually, such an operation requires labor.

A technique disclosed in JP 2012-192512 A is characterized in that a weight of machining liquid obtained by mixing liquid and oil is measured using a measuring tank, and liquid of a reduced amount is replenished. The reduced amount of machining liquid is computed based on density of computed machining liquid, density of liquid and density of oil based on volume of machining liquid and weight of the machining liquid. There is a problem that to measure the weight, a tank for measuring is separately required.

SUMMARY OF THE INVENTION

In view of the problem of the above-described conventional technique, it is an object of the present invention to provide an electric discharge machine having a function to automatically calculate a weight of a workpiece without using a measuring device such as a weight scale.

According to the present invention, machining liquid is supplied until a water level of the machining liquid in a machining tank reaches a predetermined height in a state where a workpiece is placed on a table, a volume of the workpiece is obtained from a difference between an amount of machining liquid reaching the predetermined water level in a state where the previously calculated workpiece is not placed on the table and an amount of machining liquid which is supplied in a state where the workpiece is placed on the table, and a weight of the workpiece placed on the table is obtained from the obtained volume and previously stored density of the workpiece. A weight of a workpiece-mounting jig when the jig is placed on the table is obtained by the same procedure as that when the workpiece is placed on the table. In a state where the jig is placed on the table and the workpiece is fixed to the jig, total volumes of the jig and the workpiece are obtained, a volume of the workpiece is obtained by finding a difference with respect to the volume of the jig, a weight of the workpiece fixed to the jig is obtained from the obtained volume and the previously stored density of the workpiece, and the obtained weight of the workpiece is added to the previously obtained weight of the jig, thereby obtaining total weights of the jig and the workpiece.

An electric discharge machine according to the present invention is an electric discharge machine having a machining tank which is provided therein with a table and stores machining liquid, the table having a workpiece placed thereon, and machining the workpiece by relatively moving the table and an electrode, and the electric discharge machine includes: a workpiece density storing section in which density of the workpiece is stored; a liquid level measuring section which measures a liquid level of the machining tank; a stored-liquid amount calculating section which mounts the workpiece in the machining tank, and which calculates a stored-liquid amount when machining liquid is stored in the machining tank until a liquid level of the machining liquid reaches a predetermined value; a volume calculating section in the machining tank calculating a volume of an amount of liquid which can be stored in the machining tank using the liquid level obtained by the liquid level measuring section when there is no workpiece in the machining tank; a workpiece volume calculating section which calculates a volume of the workpiece from a difference between values calculated by the stored-liquid amount calculating section and by the volume calculating section in the machining tank; and a workpiece weight calculating section which calculates a weight of the workpiece from the volume of the workpiece calculated by the workpiece volume calculating section using the density of the workpiece which is called up from the workpiece density storing section.

Furthermore, an electric discharge machine according to the present invention is an electric discharge machine having a machining tank which is provided therein with a table and stores machining liquid, the table having a workpiece placed thereon, and machining the workpiece by relatively moving the table and an electrode, and the electric discharge machine includes: a jig which fixes the workpiece; a jig density storing section in which density of the jig is stored; a liquid level measuring section which measures a liquid level of the machining tank; a stored-liquid amount calculating section which mounts the jig in the machining tank, and which calculates a stored-liquid amount when machining liquid is stored in the machining tank until a liquid level of the machining liquid reaches a predetermined value; a volume calculating section in the machining tank which calculates a volume of an amount of liquid which can be stored in the machining tank using the liquid level obtained by the liquid level measuring section when there is no jig in the machining tank; a jig volume calculating section which calculates a volume of the jig from a difference between values calculated by the stored-liquid amount calculating section and by the volume calculating section in the machining tank; and a jig weight calculating section which calculates a weight of the jig from the volume of the jig calculated by the jig volume calculating section using the density of the jig which is called up from the jig density storing section.

Furthermore, an electric discharge machine is an electric discharge machine having a machining tank which is provided therein with a table and stores machining liquid, the table having a workpiece placed thereon, and machining the workpiece by relatively moving the table and an electrode, and the electric discharge machine includes: a workpiece density storing section in which density of the workpiece is stored; a jig density storing section which stores density of a jig which fixes the workpiece; a liquid level measuring section which measures a liquid level of the machining tank; a stored-liquid amount calculating section which mounts the jig in the machining tank, and which calculates a stored-liquid amount when machining liquid is stored in the machining tank until a liquid level of the machining liquid reaches a predetermined value; a volume calculating section in the machining tank which calculates a volume of an amount of liquid which can be stored in the machining tank using the liquid level obtained by the liquid level measuring section when there is no jig in the machining tank; a jig volume calculating section which calculates a volume of the jig from a difference between values calculated by the stored-liquid amount calculating section and by the volume calculating section in the machining tank; and a jig weight calculating section which calculates a weight of the jig from the volume of the jig calculated by the jig volume calculating section using the density of the jig which is called up from the jig density storing section, wherein a total volume of the jig and the workpiece is calculated using the liquid level measuring section, the liquid-storing time measuring section, the stored-liquid amount calculating section, the volume calculating section in the machining tank, and the jig volume calculating section, a volume of the workpiece is calculated by finding a difference between the total volume and the volume of the jig, a weight of the workpiece is calculated using the volume of the workpiece and the density of the workpiece which is called up by the workpiece density storing section, and the electric discharge machine has a function to calculate a total weight of the workpiece and the jig by combining the weight of the jig and the weight of the workpiece with each other.

The electric discharge machine includes a leaked-liquid amount measuring section which measures an amount of liquid which leaks from the machining tank, and a liquid amount in the machining tank may be calculated by finding a difference between a stored-liquid amount into the machining tank acquired by the stored-liquid amount calculating section and an amount of liquid leaked from the machining tank acquired by the leaked-liquid amount measuring section.

The liquid level measuring section may use one or more of the following elements: a liquid level sensor mounted in the machining tank; a value calculated from a height of a Z-axis of an upper electrode support portion which supports the electrode by interlocking the liquid level and the height of the Z-axis of the upper electrode support portion; a liquid level when a float switch is mounted on the upper electrode support portion and the machining liquid reaches the float switch; and a value calculated from the height of the Z-axis of the upper electrode support portion when the float switch is mounted on the upper electrode support portion and the machining liquid reaches the float switch.

Here, the upper electrode support portion is an upper guide support portion which supports a wire electrode in the case of the wire electric discharge machine, and is an electrode holder which fixes an electrode in the case of a die-sinking electric discharge machine.

The stored-liquid amount calculating section includes a liquid-storing time measuring section which measures liquid-storing time during which liquid flows from the liquid storage tank in which machining liquid is stored to the machining tank, and the stored-liquid amount to the machining tank may be calculated by integrating a previously measured liquid-storing flow rate to the machining tank and the liquid-storing time to the machining tank calculated by the liquid-storing time measuring section.

The stored-liquid amount calculating section includes a flowmeter in a pipe conduit through which machining liquid is sent from the liquid-storing time which stores the machining liquid to the machining tank, and the stored-liquid amount calculating section may calculate the stored-liquid amount to the machining tank by integrating a flow rate acquired from the flowmeter.

A liquid amount calculating section in the machining tank may calculate an amount of liquid stored in the machining tank using one or more of the following liquid levels: a liquid level acquired from a liquid level sensor mounted in the machining tank; a liquid level acquired from a position in a Z-axis of an upper electrode support portion which interlocks with a liquid level of the machining tank; a liquid level when a float switch is mounted on the upper electrode support portion and the machining liquid reaches the float switch; and a liquid level calculated from a height in the Z-axis of the upper electrode support portion when the float switch is mounted on the upper electrode support portion and the machining liquid reaches the float switch. Here, the upper electrode support portion is the upper guide support portion which supports the wire electrode in the case of the wire electric discharge machine, and is the electrode holder which fixes the electrode in the case of the die-sinking electric discharge machine.

The electric discharge machine includes a pitch error correction amount calculating section which calculates a pitch error correction amount from the workpiece weight calculated by the workpiece weight calculating section, and from a stored-liquid amount in the machining tank calculated by the stored-liquid amount calculating section, and the pitch error correction amount may be reflected to an axis moving amount which commands the pitch error correction amount from a controller.

After a liquid-storing operation to the machining tank is completed, a liquid level of the stored-liquid amount stored in the machining tank may be calculated using the liquid level measuring section, a liquid level difference between the liquid level and a liquid level when the liquid-storing operation is completed is calculated, and the electric discharge machine may include a liquid amount variation calculating section which calculates liquid amount variation in the machining tank using the liquid level difference.

According to the present invention, it is possible to provide an electric discharge machine having a function to automatically calculate a weight of a workpiece without using a measuring device such as a weight scale.

BRIEF DESCRIPTION OF THE DRAWINGS

The above-described and other objects and features of the present invention will become apparent from the following description of an embodiment with reference to the attached drawings, wherein.

DETAILED DESCRIPTION OF THE PREFERRED EMBODIMENTS

An embodiment of the present invention will be described together with the drawings.
<Measuring Method of Weight of Workpiece>

A wire electric discharge machine having a function to automatically calculate a weight of a workpiece to be machined according to the present invention will be described. More specifically, a weight $W_1$ of a workpiece is automatically calculated by executing the following process.

Figure 1:
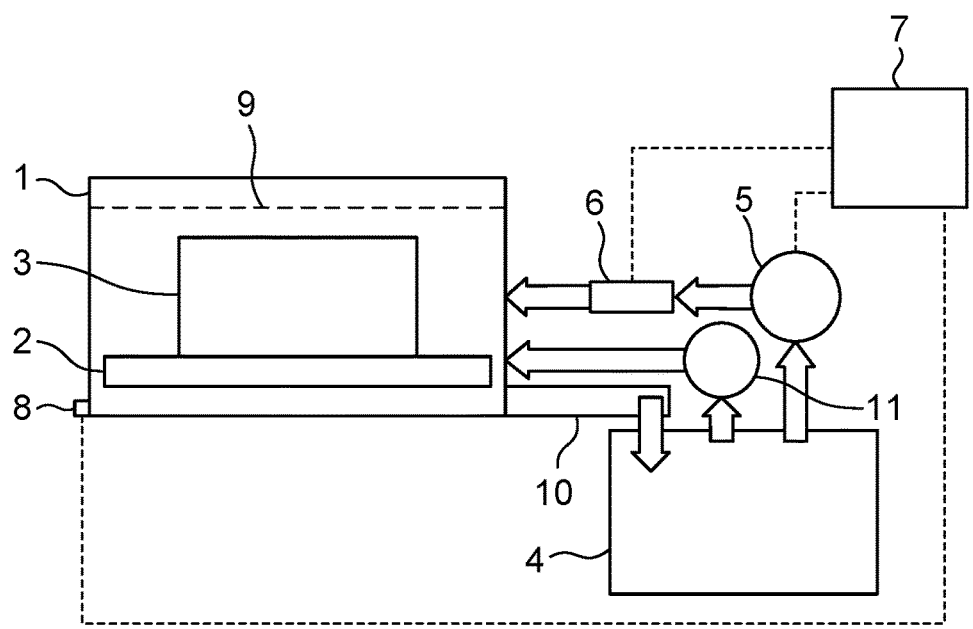
FIG. 1 is a schematic diagram of an electric discharge machine.

FIG. 1 is a schematic diagram of the electric discharge machine.

A liquid level $h_1$ of a machining tank 1 is measured using a liquid level measuring section which measures a liquid level of the machining tank 1 when machining liquid is stored in the machining tank 1 from a liquid storage tank 4. More specifically, a liquid level (machining tank liquid level 9) stored in the machining tank 1 uses data acquired from a liquid level sensor 8 mounted in the machining tank 1. Instead of the liquid level sensor 8, there are also a method in which a height (=position of upper electrode support portion, position of upper nozzle and the like) of a Z-axis which supports and moves an electrode and a liquid level of the machining tank 1 are interlocked, and a liquid level is calculated from the height of the Z-axis, and a method in which a float switch is mounted on the upper electrode support portion, and a liquid level or a height of the Z-axis itself when the machining liquid reaches a position of the float switch is determined as the liquid level. When the method in which the height of the Z-axis and the liquid level of the machining tank are interlocked and the liquid level is calculated from the height of the Z-axis is used, liquid level data is obtained from the height of the Z-axis without storing liquid level in the machining tank.

Next, liquid-storing time into the machining tank 1 required until a liquid level reaches a predetermined value in the liquid level measuring section is measured. A liquid-storing time measuring section outputs signals to a control unit when a liquid-storing operation into the machining tank 1 is started and the liquid-storing operation is completed, and a difference in time when the respective signals are output is found, thereby measuring time t required for storing liquid into the machining tank 1.

Next, a stored-liquid amount calculating section calculates a stored-liquid amount into the machining tank 1 when a workpiece 3 is mounted on a table 2 in the machining tank 1 and machining liquid is stored in the machining tank 1 up to a height of the workpiece 3 or higher. A flow rate $Q_1$ when liquid is stored in the machining tank 1 from the liquid storage tank 4 is previously measured, and the stored-liquid amount $V_1$ into the machining tank 1 is calculated using the time t required for storing liquid into the machining tank which is measured by the liquid-storing time measuring section ($V_1 = t \cdot Q_1$). A flowmeter 6 is placed in a liquid-storing pipe conduit into the machining tank 1 from the liquid storage tank 4, flow rate data $Q_2(t)$ is received on the side of a controller 7, the received flow rate value is integrated and the stored-liquid amount $V_1$ into the machining tank 1 may be calculated ($V_1 = \Sigma Q_2(t)$). A liquid level calculating section such as a liquid level meter and a pressure meter is mounted on the liquid storage tank 4. A liquid-storing pump 5 which stores liquid in the machining tank 1 is placed on the liquid storage tank 4. A liquid reduction amount $\Delta V_2$ in the liquid storage tank 4 is calculated from a liquid level amount $\Delta h_2$ which is reduced in the liquid storage tank 4, thereby obtaining a stored-liquid amount $V_1$ ($=\Delta V_2$) in the machining tank.

When the liquid-storing operation is started from a state where machining liquid supplied into the machining tank 1 by means of replenishing liquid exists in the machining tank 1, a liquid surface height $h_3$ of the machining tank is previously measured by the liquid level sensor 8 mounted in the machining tank 1, and if liquid amount $V_3$ calculated from the liquid surface height $h_3$ is added to the liquid amount $V_1$, it is possible to calculate the stored-liquid amount in the machining tank 1 even when the liquid-storing operation is started from the state where liquid exists in the machining tank.

Machining liquid leaks from a drain or a seal plate of the machining tank during the liquid-storing operation into the machining tank 1 in some cases. Therefore, a leaked-amount measuring section which measures a total liquid amount $Q_4$ which leaks from a drain 10 or the seal plate of the machining tank 1 may be provided in the stored liquid in the machining tank 1, and the stored-liquid amount may be calculated by subtracting the leaked amount from the calculated stored-liquid amount.

A leaked-liquid amount $Q_2$ from a drain 10 is calculated by placing a flowmeter at a drain outlet, by receiving a flow rate value $V_4$ of the drain outlet on the side of the controller, and by integrating the received flow rate value $V_4$. The leaked-liquid amount $Q_3$ from the seal plate is calculated by placing a saucer under the seal plate, by placing a flowmeter in a flow-path through liquid flows from the saucer to the liquid storage tank 4, receiving a flow rate value $V_5$ of a flow-path through which liquid flows from the saucer into the liquid storage tank 4 by the controller, and by integrating the received flow rate value $V_5$. Liquid leaked from the drain 10 is made to merge with liquid leaked from the seal plate, and a leaked-liquid amount $V_6$ $(=V_4+V_5)$ after the merging may collectively be measured from the flow amount $Q_4$ $(=Q_2+Q_3)$ after the merging.

The leaked-liquid amount $V_6$ is fed back to the stored-liquid amount into the machining tank 1 acquired by the stored-liquid amount calculating section and is fed back to the controller. According to this, it is possible to more precisely calculate the stored-liquid amount $V_1$ into the machining tank calculated by the stored-liquid amount calculating section.

There is also a method in which a leaked-liquid amount per unit time is previously measured, and its value is stored in the controller 7 and is used. However, since a liquid amount leaking from the drain 10 or the seal plate is varied depending upon a liquid surface position of liquid stored in the machining tank 1, it is not possible to control while using a precise value. It also seems possible to employ a method in which a leaked-liquid amount corresponding to the liquid surface position is previously measured, and its value is stored in the controller 7 and is used. However, since the liquid amount leaking from the seal plate is varied by aging degradation of the seal plate, it is difficult to use this method in the wire electric discharge machine which is frequently used for a long term. It also seems possible to employ a method in which an aging degradation amount of the seal plate is previously measured, and its value is stored in the controller 7 and is used. However, the aging degradation amounts of the seal plates depend on using environment of individual wire electric discharge machines, and the aging degradation amount is varied depending upon the using environment and therefore, this method is not effective.

Next, there is provided a volume calculating section in the machining tank which calculates a volume $V_7$ of a liquid amount which can be stored in the machining tank 1 in a state where the workpiece 3 is detached and nothing exists in the machining tank 1. To calculate the volume, liquid level data $h_1$ obtained by the liquid level measuring section is used. The volume may be calculated using the liquid level data and the height of the Z-axis acquired by the stored-liquid amount calculating section when liquid is stored in the machining tank 1. This process may be executed before the workpiece 3 is mounted.

Next, the volume calculating section in the machining tank will be described. The volume calculating section in the machining tank calculates the volume $V_7$ in the machining tank which can store the machining liquid up to the same height when the workpiece is mounted in a state where the workpiece 3 is detached and nothing exists in the machining tank 1. To calculate the volume, liquid level data $h_1$ obtained by the liquid level measuring section is used. The volume may be calculated using the liquid level data and the height of the Z-axis acquired by the stored-liquid amount calculating section when liquid is stored in the machining tank 1. This process may be executed before the workpiece 3 is mounted.

Next, a volume $V_8$ of the workpiece 3 in the machining tank 1 is calculated by a workpiece volume calculating section. A volume $V_9$ of the workpiece 3 mounted in the machining tank 1 is calculated by finding a difference $(=V_7-V_1)$ between the liquid amount $V_7$ in the machining tank acquired by the volume calculating section in the machining tank when the workpiece 3 is not placed and a stored-liquid amount $V_1$ calculated by the stored-liquid amount calculating section when the workpiece 3 is placed.

Next, a weight of the workpiece 3 is calculated from the volume of the workpiece 3 and density of the workpiece 3. The controller 7 can recognize density $\rho_1$ of the workpiece 3 by previously storing the density $\rho_1$ corresponding to material of the workpiece 3 in the controller 7 (workpiece density storing section), and by calling up the density $\rho_1$ at the same time when the material of the workpiece 3 to be machined is selected using a setting screen. A workpiece weight calculating section calculates a weight $W_1$ $(=\rho_{11} \cdot V_9)$ of the workpiece 3 from a workpiece volume $V_9$ calculated by the workpiece volume calculating section using the density $\rho_1$ of the called up workpiece 3.

Figure 2:
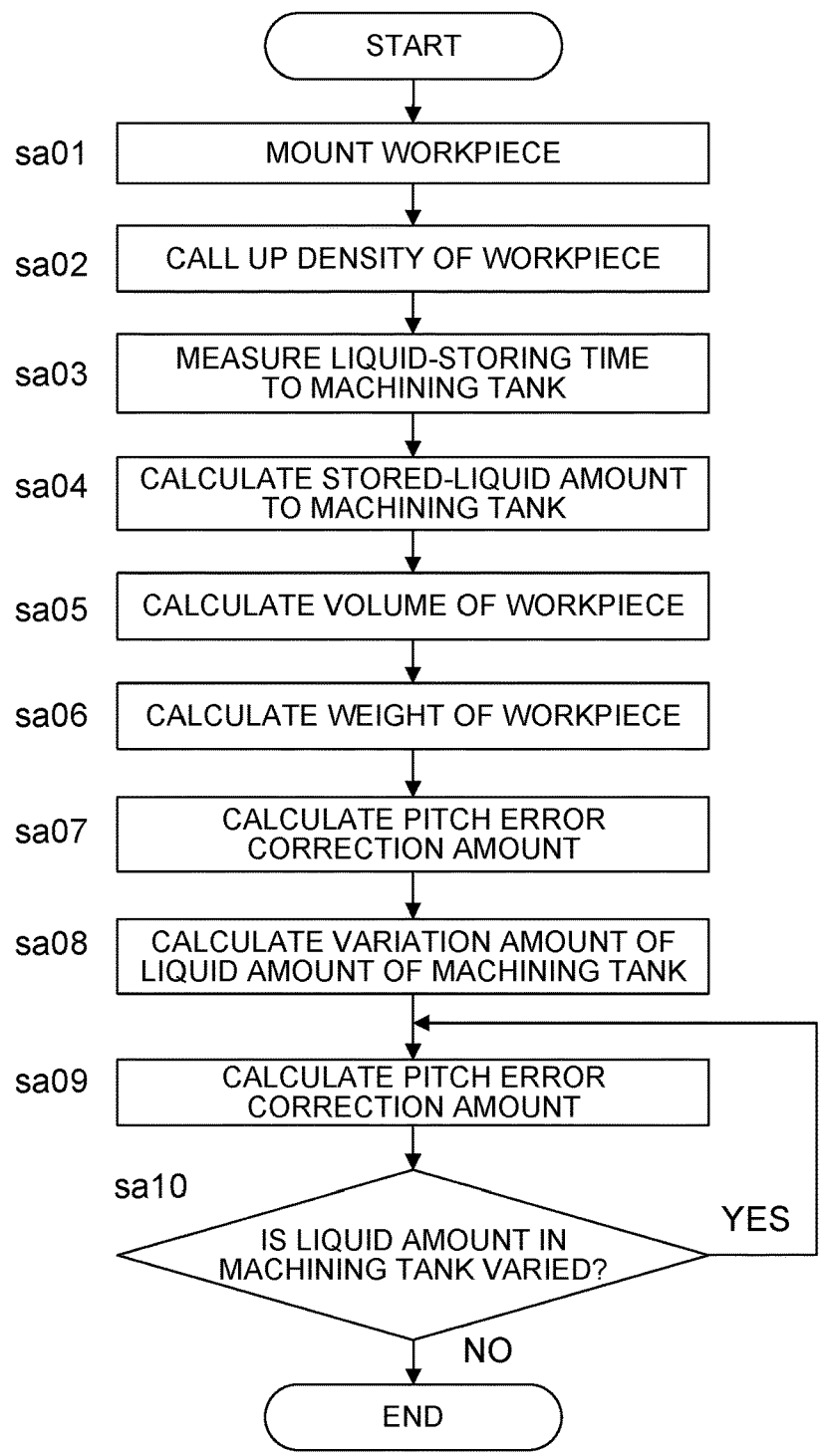
FIG. 2 is a diagram showing a flow of a calculating process of a workpiece weight.

FIG. 2 is a diagram showing a flow of a calculating process of the workpiece weight. The flow will be described in accordance with steps.

[Step sa01] A workpiece is mounted in the machining tank.
[Step sa02] Density of the workpiece is called up.
[Step sa03] Liquid-storing time into the machining tank is measured.
[Step sa04] A stored-liquid amount into the machining tank is calculated.
[Step sa05] A volume of the workpiece is calculated.
[Step sa06] A workpiece weight is calculated.
[Step sa07] A pitch error correction amount is calculated.
[Step sa08] A liquid amount variation amount of the machining tank is calculated.
[Step sa09] A pitch error correction amount is calculated.
[Step sa10] It is determined whether a liquid amount in the machining tank is varied. If the liquid amount is varied (YES), the procedure returns to step sa09, and if the liquid amount is not varied (NO), the procedure is completed.

<Measuring Method of Weight of a Jig which Fixes Workpiece>

The wire electric discharge machine having a function to automatically calculate a weight $W_2$ of a jig which fixes a workpiece according to the present invention will be described. More specifically, the weight of the jig is automatically calculated by executing the following processes.

A jig volume calculating section calculates a volume $V_{10}$ of a jig in the machining tank 1. The volume $V_{10}$ $(V_7-V_{11})$ of the jig mounted in the machining tank 1 is calculated by finding a difference between the volume $(=V_7)$ in the machining tank which can store machining liquid up to the same height when the jig is mounted acquired by the liquid volume calculating section in the machining tank in a state where nothing exists in the machining tank 1 and a stored-liquid amount $V_{11}$ calculated by the stored-liquid amount calculating section when the jig is placed.

Next, a weight of the jig is calculated from a volume of the jig and density of the jig. The controller 7 can recognize the density of the jig by previously storing density $\rho_2$ corresponding to material of the jig in the controller 7 (jig density storing section), and by calling up the density at the same time when the material of the jig is selected using a setting screen.

A jig weight calculating section for calculating the jig weight in the machining tank 1 is provided. According to this, a weight $W_2$ ($=\rho_2 \cdot V_{10}$) of the jig is calculated from a volume of the jig calculated by the jig volume calculating section when only the jig is mounted using jig density $\rho_2$ which is called up by a jig density calling up section.

Figure 3:
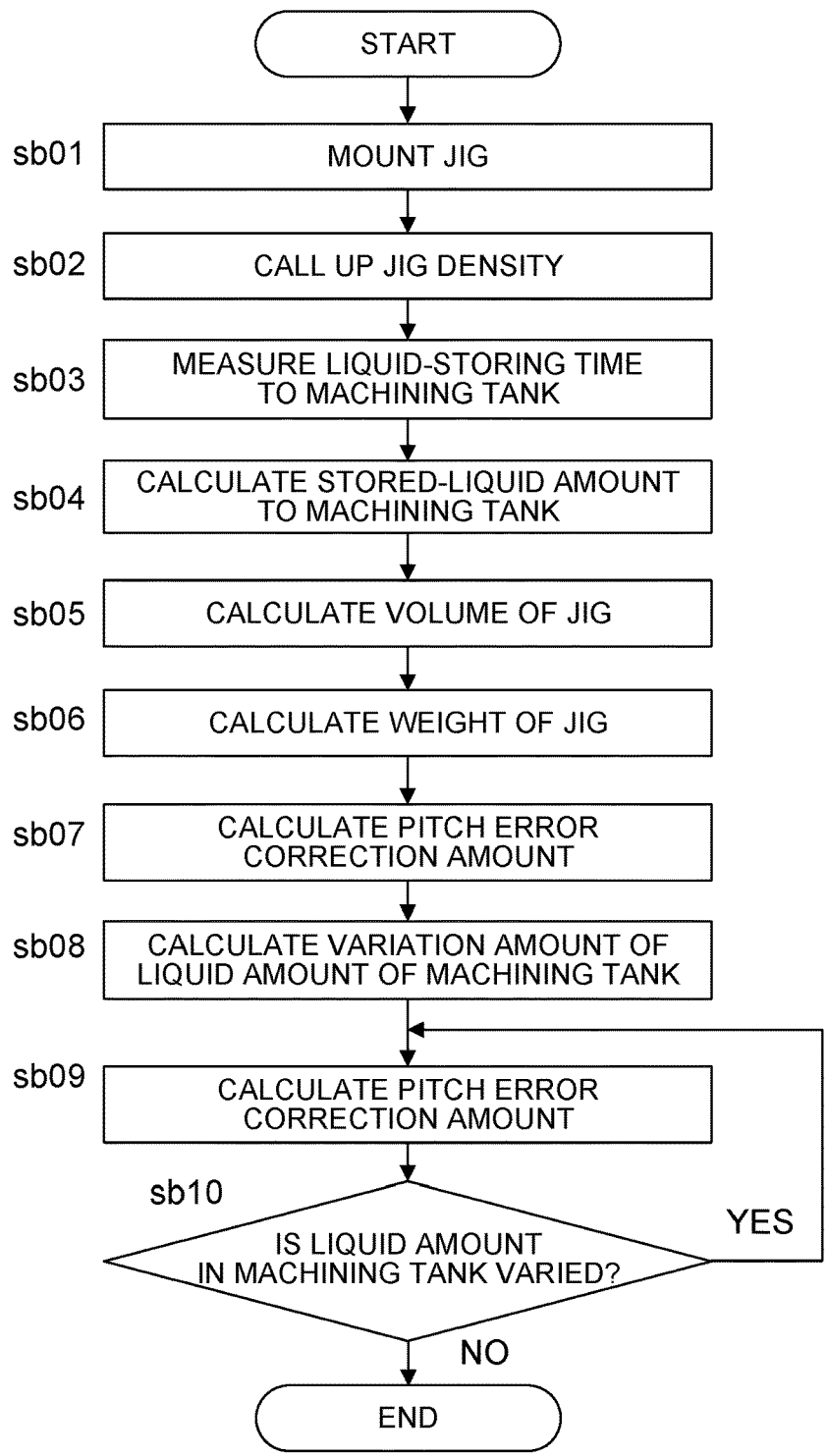
FIG. 3 is a diagram showing a flow of a calculating process of a jig weight.

FIG. 3 is a diagram showing a flow of a calculating process of a jig weight. The flow will be described in accordance with steps.

[Step sb01] The jig is mounted in the machining tank.
[Step sb02] The jig density is called up.
[Step sb03] Liquid-storing time into the machining tank is measured.
[Step sb04] A stored-liquid amount into the machining tank is calculated.
[Step sb05] A volume of the jig is calculated.
[Step sb06] A jig weight is calculated.
[Step sb07] A pitch error correction amount is calculated.
[Step sb08] A liquid amount variation amount of the machining tank is calculated.
[Step sb09] A pitch error correction amount is calculated.
[Step sb10] It is determined whether a liquid amount in the machining tank is varied. If the liquid amount is varied (YES), the procedure returns to step sb09, and if the liquid amount is not varied (NO), the procedure is completed.

<Measuring Method of Total Weight of Workpiece and Jig when Jig made of Material which is Different from that of Workpiece is Mounted>

The wire electric discharge machine having a function to calculate a total weight of the workpiece and the jig when the jig made of material which is different from that of the workpiece according to the present invention will be described. More specifically, the total weight of the workpiece and the jig is calculated by executing the following processes.

The volume $V_{10}$ and the weight $W_2$ of the jig when only the jig is mounted is calculated using the liquid level measuring section, the liquid-storing time measuring section, the stored-liquid amount calculating section, the volume calculating section in the machining tank, the jig volume calculating section and the jig weight calculating section.

Next, a total volume $V_{12}$ ($=V_8+V_{10}$) of the jig and the workpiece is calculated using the liquid level measuring section, the liquid-storing time measuring section, the stored-liquid amount calculating section, the volume calculating section in the machining tank, the workpiece volume calculating section or the jig volume calculating section in a state where the workpiece 3 is mounted on the jig.

Next, a volume $V_8$ of the workpiece is calculated by finding a difference between the calculated a total volume $V_{12}$ of the jig and the workpiece 3 and the volume $V_{10}$ of the jig.

Next, a weight $W_1$ ($=\rho_1 \cdot V_8$) of the workpiece is calculated from the workpiece weight calculating section using the calculated volume of the workpiece and the density $\rho_1$ of the workpiece which is called up by a workpiece density calling up section.

Next, the calculated weight $W_2$ of the jig and the weight $W_1$ of the workpiece are added to each other, and a total weight $W_3$ ($W_3=W_1+W_2$) of the workpiece 3 and the jig is calculated.

When the materials of the workpiece 3 and the jig are the same, a total weight of the workpiece 3 and the jig is measured using means for calculating the weight of the workpiece 3 or means for calculating the weight of the jig.

By using the above method, the total weight of the workpiece 3 and the jig when the materials of the workpiece 3 and the jig are different from each other is calculated.

Figure 4:
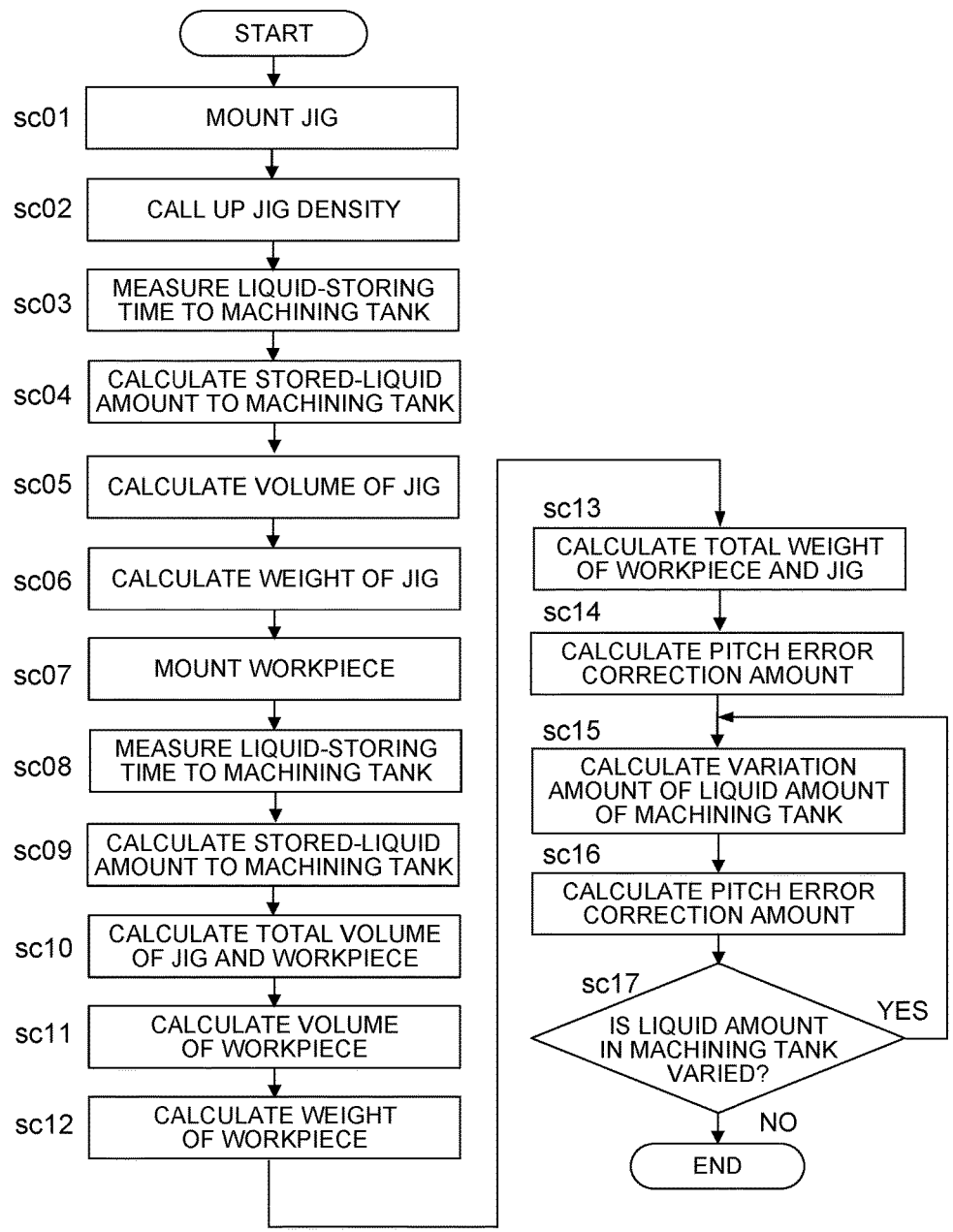
FIG. 4 is a diagram showing a flow of a calculating process of a total weight of a workpiece and a jig.

FIG. 4 is a diagram showing a flow of a calculating process of the total weight of the workpiece and the jig. The flow will be described in accordance with steps.

[Step sc01] A jig is mounted in the machining tank.
[Step sc02] The jig density is called up.
[Step sc03] Liquid-storing time into the machining tank is measured.
[Step sc04] A stored-liquid amount into the machining tank is calculated.
[Step sc05] A volume of the jig is calculated.
[Step sc06] A jig weight is calculated.
[Step sc07] A workpiece is mounted in the machining tank.
[Step sc08] Liquid-storing time into the machining tank is measured.
[Step sc09] A stored-liquid amount into the machining tank is calculated.
[Step sc10] A total volume of the jig and the workpiece is calculated.
[Step sc11] A workpiece volume is calculated.
[Step sc12] A workpiece weight is calculated.
[Step sc13] A total weight of the workpiece and the jig is calculated.
[Step sc14] A pitch error correction amount is calculated.
[Step sc15] A liquid amount variation amount of the machining tank is calculated.
[Step sc16] A pitch error correction amount is calculated.
[Step sc17] It is determined whether a liquid amount in the machining tank is varied. If the liquid amount is varied (YES), the procedure returns to step sc16, and if the liquid amount is not varied (NO), the procedure is completed.

<Calculation of Pitch Error Correction Amount>

Since the pitch error correction amount calculating section is provided, the pitch error correction amount is calculated using the workpiece weight calculated by the workpiece weight calculating section, and using the stored-liquid amount in the machining tank 1 in which the liquid variation amount calculated by the liquid amount variation calculating section is added to the stored-liquid amount in the machining tank 1 calculated by the stored-liquid amount calculating section, and this is reflected to an axis-moving amount on the side of the controller 7.

When the workpiece 3 is mounted on the jig, the total weight of the workpiece 3 and the jig is calculated using the above-described technique, and the pitch error correction amount when the workpiece is mounted on the jig is calculated more precisely. The correction amount is determined using a value in which a relation between a weight of a material placed in the machining tank 1 and the correction amount is previously calculated or using the relation between the weight and the correction amount.

There is provided a liquid amount variation calculating section which calculates a stored-liquid amount varied in the machining tank 1 after the liquid-storing operation into the machining tank 1 is completed. A constant amount of replenishing liquid always flows through the machining tank 1 using a circulation pump 11. Control to even out a liquid level in the machining tank 1 is performed by using the drain 10, but a liquid amount in the machining tank 1 is slightly varied from a reference amount. A liquid amount in the machining tank 1 is calculated using the liquid amount variation calculating section. If the liquid amount in the machining tank 1 is varied, a weight in the machining tank 1 is also varied correspondingly, and a correction amount of the pitch error is also varied. By reflecting the calculated liquid variation amount to the pitch error correction amount, the pitch error correction amount is calculated more precisely.

As described above, according to the present invention, it is possible to automatically calculate weights of a workpiece and a jig placed in the machining tank. The invention is especially effective for a heavy workpiece and a heavy jig for which the measuring operation is troublesome.

Since it is possible to automatically calculate a weight of a workpiece placed in the machining tank only by storing liquid in the machining tank, it becomes unnecessary to previously measure the weight of the workpiece whenever the workpiece is exchanged, and the productivity is enhanced.

Since it is possible to prevent a measurement error and an input error of a weight by automatically calculating weights of a workpiece and a jig and by inputting the measured value to the controller, it is possible to prevent a correction error of a pitch error amount. It is possible to more precisely correct the pitch error by calculating the liquid variation amount in the machining tank.

The above-described technique can be applied not only to the wire electric discharge machine but also to other electric discharge machine such as a die-sinking electric discharge machine.

The invention claimed is:

1. An electric discharge machine having a machining tank which is provided therein with a table and stores machining liquid, the table having a workpiece placed thereon, and machining the workpiece by relatively moving the table and an electrode, the electric discharge machine comprising:
a workpiece density storing section in which density of the workpiece is stored;
a liquid level measuring section which measures a liquid level of the machining tank;
a stored-liquid amount calculating section which calculates the stored-liquid amount when the workpiece is attached in the machining tank, and a machining liquid is stored in the machining tank until the liquid level of the machining liquid reaches a predetermined value;
a volume calculating section in the machining tank calculating a volume of an amount of liquid which can be stored in the machining tank using the liquid level obtained by the liquid level measuring section when there is no workpiece in the machining tank;
a workpiece volume calculating section which calculates a volume of the workpiece from a difference between values calculated by the stored-liquid amount calculating section and by the volume calculating section in the machining tank; and
a workpiece weight calculating section which calculates a weight of the workpiece from the volume of the workpiece calculated by the workpiece volume calculating section using the density of the workpiece which is called up from the workpiece density storing section.

2. The electric discharge machine according to claim 1, comprising a leaked-liquid amount measuring section which measures an amount of liquid which leaks from the machining tank, wherein
a liquid amount in the machining tank is calculated by finding a difference between a stored-liquid amount into the machining tank acquired by the stored-liquid amount calculating section and an amount of liquid leaked from the machining tank acquired by the leaked-liquid amount measuring section.

3. The electric discharge machine according to claim 1, further comprising: a liquid storage tank which stores a machining liquid to be supplied to the machining tank; and a liquid level acquiring section which acquires the liquid level of the machining liquid in the storage tank, wherein
the stored-liquid amount calculating section calculates the stored-liquid amount in the machining tank on the basis of the liquid level of the machining liquid acquired in the liquid level acquiring section.

4. The electric discharge machine according to claim 1, wherein the liquid level measuring section uses one or more of the following elements:
a liquid level sensor mounted in the machining tank;
a value calculated from a height of a Z-axis of an upper electrode support portion which supports the electrode by interlocking the liquid level and the height of the Z-axis of the upper electrode support portion;
a liquid level when a float switch is mounted on the upper electrode support portion and the machining liquid reaches the float switch; and
a value calculated from the height of the Z-axis of the upper electrode support portion when the float switch is mounted on the upper electrode support portion and the machining liquid reaches the float switch.

5. The electric discharge machine according to claim 1, wherein the stored-liquid amount calculating section includes a liquid-storing time measuring section which measures the liquid-storing time during which liquid flows from the liquid storage tank for storing the machining liquid to the machining tank, and
the stored-liquid amount in the machining tank is calculated by multiplying the flow rate of the liquid to be stored in the machining tank, which has been measured in advance, by the period of time during which the liquid has been stored in the machining tank and which is calculated by the liquid-storing time measuring section.

6. The electric discharge machine according to claim 1, wherein the stored-liquid amount calculating section includes a flowmeter along a pipe conduit through which a machining liquid is sent from the liquid storage tank for storing the machining liquid to the machining tank and calculates the stored-liquid amount in the machining tank by integrating flow rates acquired from the flowmeter.

7. The electric discharge machine according to claim 1, wherein the volume calculating section in the machining tank calculates the amount of liquid stored in the machining tank using one or more of the following liquid levels:
a liquid level acquired from a liquid level sensor mounted in the machining tank;
a liquid level acquired from a position in a Z-axis of an upper electrode support portion which interlocks with a liquid level of the machining tank;
a liquid level when a float switch is mounted on the upper electrode support portion and the machining liquid reaches the float switch; and
a liquid level calculated from a height in the Z-axis of the upper electrode support portion when the float switch is mounted on the upper electrode support portion and the machining liquid reaches the float switch.

8. The electric discharge machine according to claim 1, further comprising a pitch error correction amount calculating section which calculates a pitch error correction amount from the weight of the workpiece calculated by the workpiece weight calculating section and the stored-liquid amount in the machining tank calculated by the stored-liquid amount calculating section, wherein
the pitch error correction amount is reflected in the axis shift amount commanded by a controller.

9. The electric discharge machine according to claim 1, further comprising a change in liquid amount calculating section which measures the level of the liquid stored in the machining tank by using the liquid level measuring section at a certain point in time after the completion of an operation for storing a liquid in the machining tank, calculates the difference between the liquid level measured at the point in time and the liquid level at the time of completion of the liquid storing operation, and calculates the change in the liquid amount in the machining tank using the difference in the liquid level.

10. An electric discharge machine having a machining tank which is provided therein with a table and stores machining liquid, the table having a workpiece placed thereon, and machining the workpiece by relatively moving the table and an electrode, the electric discharge machine comprising:
 a jig which fixes the workpiece;
 a jig density storing section in which density of the jig is stored;
 a liquid level measuring section which measures a liquid level of the machining tank;
 a stored-liquid amount calculating section which calculates the stored-liquid amount when the jig is attached in the machining tank, and a machining liquid is stored in the machining tank until the liquid level of the machining liquid reaches a predetermined value;
 a volume calculating section in the machining tank which calculates a volume of an amount of liquid which can be stored in the machining tank using the liquid level obtained by the liquid level measuring section when there is no jig in the machining tank;
 a jig volume calculating section which calculates a volume of the jig from a difference between values calculated by the stored-liquid amount calculating section and by the volume calculating section in the machining tank; and
 a jig weight calculating section which calculates a weight of the jig from the volume of the jig calculated by the jig volume calculating section using the density of the jig which is called up from the jig density storing section.

11. An electric discharge machine having a machining tank which is provided therein with a table and stores machining liquid, the table having a workpiece placed thereon, and machining the workpiece by relatively moving the table and an electrode, the electric discharge machine comprising:
 a workpiece density storing section in which density of the workpiece is stored;
 a jig density storing section which stores density of a jig which fixes the workpiece;
 a liquid level measuring section which measures a liquid level of the machining tank;
 a stored-liquid amount calculating section which calculates the stored-liquid amount when the jig is attached in the machining tank, and a machining liquid is stored in the machining tank until the liquid level of the machining liquid reaches a predetermined value;
 a volume calculating section in the machining tank which calculates a volume of an amount of liquid which can be stored in the machining tank using the liquid level obtained by the liquid level measuring section when there is no jig in the machining tank;
 a jig volume calculating section which calculates a volume of the jig from a difference between values calculated by the stored-liquid amount calculating section and by the volume calculating section in the machining tank; and
 a jig weight calculating section which calculates a weight of the jig from the volume of the jig calculated by the jig volume calculating section using the density of the jig which is called up from the jig density storing section, wherein
 a total volume of the jig and the workpiece is calculated using the liquid level measuring section, the stored-liquid amount calculating section, the volume calculating section in the machining tank, and the jig volume calculating section,
 a volume of the workpiece is calculated by finding a difference between the total volume and the volume of the jig,
 a weight of the workpiece is calculated using the volume of the workpiece and the density of the workpiece which is called up by the workpiece density storing section, and
 the electric discharge machine has a function to calculate a total weight of the workpiece and the jig by combining the weight of the jig and the weight of the workpiece with each other.

* * * * *